United States Patent [19]
Fox et al.

[11] 4,102,540
[45] Jul. 25, 1978

[54] TANK SUSPENSION

[75] Inventors: Robert Eugene Fox, Minburn; Wendell Dale Reece, Ankeny, both of Iowa

[73] Assignee: Deere & Company, Moline, Ill.

[21] Appl. No.: 774,764

[22] Filed: Mar. 7, 1977

[51] Int. Cl.² ............................................. B60P 3/22
[52] U.S. Cl. ................................. 280/5 H; 244/136
[58] Field of Search ............... 280/5 R, 5 A, 5 H; 244/136, 135 B, 135 R; 248/317, 318; 220/71

[56] References Cited
U.S. PATENT DOCUMENTS

| | | | |
|---|---|---|---|
| 1,273,614 | 7/1918 | Jacobs | 280/5 A |
| 1,321,857 | 11/1919 | Snell | 280/5 A |
| 2,090,059 | 8/1937 | McClane | 220/5 H |
| 3,251,500 | 5/1966 | Archbold | 220/71 |
| 3,588,136 | 6/1971 | Schlueter | 280/5 A |
| 3,966,147 | 6/1976 | Ivittko | 244/135 B |

*Primary Examiner*—Joseph F. Peters, Jr.
*Assistant Examiner*—R. Schrecengost

[57] ABSTRACT

Structure for rockably suspending a flexible fluid container from a vehicle frame includes a flexible saddle wherein the container is carried and hanger elements universally suspending the saddle from the frame.

16 Claims, 3 Drawing Figures

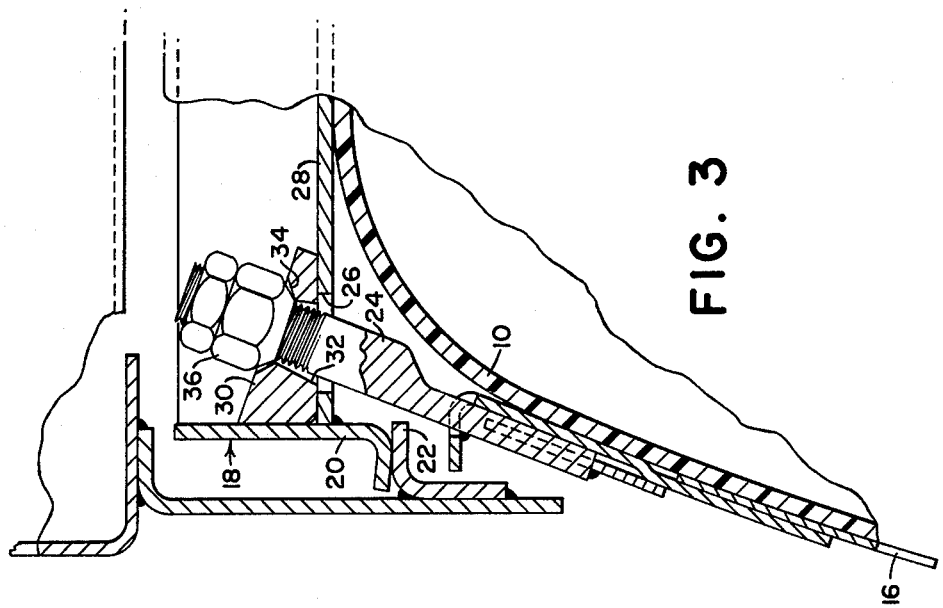
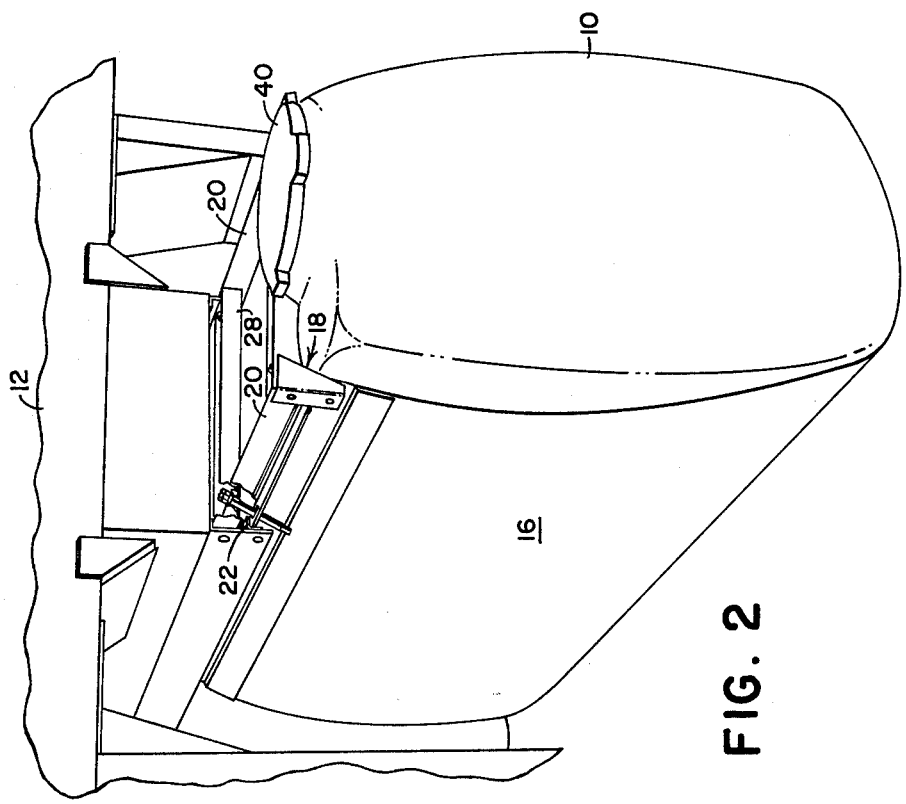

TANK SUSPENSION

BACKGROUND OF THE INVENTION

This invention relates generally to agricultural spraying equipment and more specifically relates to structure for suspending a solution tank beneath the frame of a sprayer vehicle.

Existing agricultural sprayer vehicles are provided with solution tanks wherein the fluids to be dispersed are contained. These tanks are generally mounted above the vehicle frame on saddles but are often suspended beneath the vehicle frame when the sprayer is intended for use on row crops. Sprayers having suspended tanks generally utilize narrow elongated solution containers which can pass between the row crops as they are sprayed.

Until recently, solution tanks were composed of galvanized steel, aluminum or other metals. Because metal tanks corrode eventually with continued exposure to various chemicals, plastic solution tanks are preferred. Plastic tanks are impervious to virtually all of the chemicals utilized in spraying, but lack the rigidity of metal tanks. Accordingly, existing plastic tanks are generally formed in a cylindrical shape and must be mounted on saddle supports above the frames of spraying vehicles or trailers to prevent deformation of the tank. It is also difficult to have a plastic tank from an overhead frame since the conventional type of hanging elements must normally be imbedded in the plastic and are subject to being broken out of the plastic upon large loads being carried in the tank.

SUMMARY OF THE INVENTION

The present invention provides a structure for removably installing and suspending or hanging a plastic or deformable solution tank from an overhead vehicle frame. This underslung design increases vehicle stability and simplifies tank mounting problems.

The mounting structure is designed to support the solution tank as the chemical solution shifts and deforms the tank. Further, this structure permits limited swinging movement of the tank and its supporting saddle to reduce the stresses encountered by the support structure between the frame and tank.

The saddle is suspended from a slide structure which can be easily inserted into frame mounted guides carried by the vehicle frame and is of a generally flexible material to reduce the support material expense, vehicle weight and corrosion problems.

BRIEF DESCRIPTION OF THE DRAWINGS

In the drawings:

FIG. 2 is an enlarged rear perspective view of the mounting structure for a plastic chemical solution tank.

FIG. 3 is an expanded rear view of the rockable suspension structure for the solution tank.

DESCRIPTION OF THE PREFERRED EMBODIMENT

Figure 1:
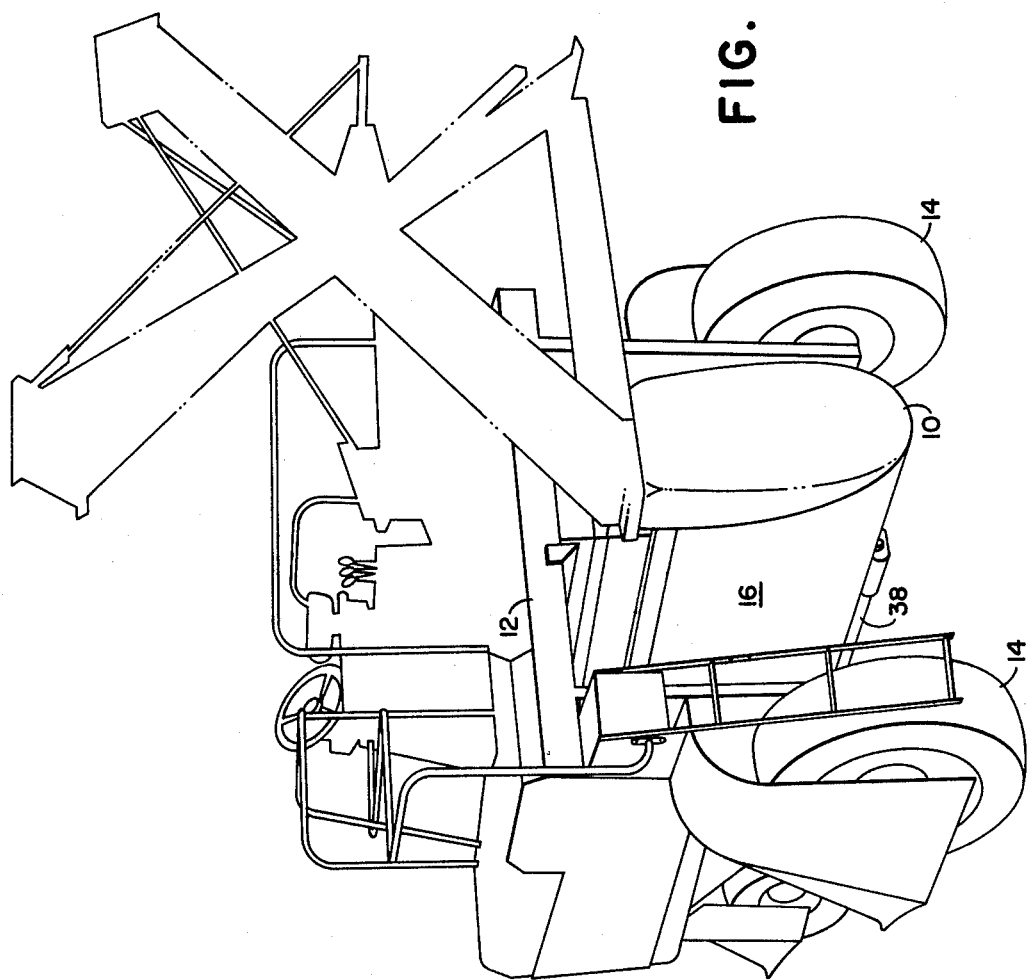
FIG. 1 is a rear perspective view of an agricultural sprayer utilizing the instant invention.

FIG. 1 illustrates an agricultural chemical sprayer having a flexible chemical tank 10 suspended beneath its fore-and-aft extending frame 12. The sprayer vehicle is specifically designed for row crop application and includes transversely spaced apart rear wheels 14 between which the tank 10 is carried. In this preferred embodiment, the tank 10 is provided with an elongated rectangular configuration to conveniently pass between adjacent rows of crops as the spraying operation is conducted.

The tank mounting and suspension structure is more clearly illustrated in the enlarged view provided in FIG. 2 and includes a flexible sheet metal saddle 16 wherein the plastic deformable solution tank 10 is carried. The saddle 16 is secured at its upper edges to a slide support 18 which includes fore-and-aft extending slide rail members 20 slidably received on horizontal rail members 22 suspended from the frame 12 of the sprayer vehicle. A more complete discussion of this type of slide and rail installation structure is provided in U.S. Pat. No. 3,588,136 issued June 28 1971.

The saddle 16 is composed of a light gauge metal to provide a flexible support for the tank 10. The saddle 16 is open at opposite ends and bears against the underside and opposite sides of the tank 10. As the plastic tank 10 incurs slight deformations due to shifting of the solution during field operations, the flexible saddle 16 will tend to also deform, although to a lesser degree, and provide continuing support for the tank 10.

At the upper edge of the saddle sides are attached a plurality of hanger elements 24. These elements 24 are best viewed in FIG. 3 and include a lower flattened portion attached to the sheet metal saddle 16 by weldment or other satisfactory means. Each hanger element 24 has an upper portion received through a vertical opening 26 in a horizontal plate 28 which is carried between the rail members 20 that rest on the fore-and-aft frame carried rails 22.

A plurality of seating blocks 30 are carried by the slide support 18 and are secured to the horizontal plate 28 and fore-and-aft extending rails 20 at their fore-and-aft extending upper juncture. The blocks 30 also include an opening 32 through which the respective hanger elements 24 are received. The walls of the opening 32 in each seating block 30 are non-parallel and assume a necked configuration. Against the inclined upper wall portions 34 of this necked opening rest the beveled surfaces of a threaded nut 34 that is secured to each respective hanger element 24. This necked opening 32 permits rocking movement of the hanger nut 36 in both a fore-and-aft and transverse direction and thereby allows the hanger element 24 to swing within the openings 32 and 26.

Initial installation of the flexible chemical tank 10 is simply accomplished as the saddle walls 16 are secured to the support 18 by inserting the hanger elements 24 through the openings 26 and 32 and screwing the nuts 36 onto respective hanger elements 24. The flexible tank 10 can then be inserted into the saddle 16 and the nuts 36 tightened to limit the arc through which the tank can swing or rock.

To install the tank 10 and saddle 16 on the vehicle, the rails 20 are first rested on the rearward terminal ends of the frame carried rails 22 and then the empty tank 10 and its support mount 18 are slidably shifted forwardly. Once the tank 10 has been installed, the various hoses 38 can be connected to the bottom of the tank 10.

To fill the tank 10, the operator removes the rearwardly top mounted lid 40 and pumps in the necessary solution or chemicals. During field spraying operations, the chemical solution will tend to shift within the tank 10 upon uneven ground contours being encountered. As this fluid shifts or the tank 10 incurs slight deformations, the saddle 16 will rock slightly about its hanger suspension with the seating blocks 30. Further, some reshaping or deforming of the tank 10 occurs in accordance with the quantity of liquid in the tank. The sheet metal saddle 16 accommodates such deformation partially through its resilient nature and partially by the manner in which it is suspended by the hanger elements 24 on the overhead frame structure. External conditions, particularly relating to temperature, also have a bearing upon the forming or reshaping of the tank 10. The amount of transverse or fore-and-aft rocking permitted can be limited by appropriate sizing of the openings 26 and 32 in the plate and block and selection of the hangers.

With this improved tank suspension structure, non-corrosive plastic solution tanks can be easily adapted to row crop spraying vehicles and maintenance expenses reduced by elimination of corrosion problems and reductions of stress related support failures.

We claim:

1. An agricultural implement comprising: a main frame; transversely spaced apart fore-and-aft extending members carried by the frame; an elongated flexible tank receivable between said members; tank support means having transversely spaced fore-and-aft extending sides for respectively engaging the members, sliding therealong and resting thereupon; and means suspending the tank from the support means for limited transverse rocking movement, including a flexible saddle member wherein said receptacle is carried.

2. The invention described in claim 1 wherein the means suspending the receptacle also permits limited fore-and-aft rocking movement.

3. The invention described in claim 1 wherein the means suspending the tank from the support means is inwardly of the sides of said tank.

4. The invention described in claim 3 wherein the saddle member includes side and bottom portions bearing against the tank to restrict movement thereof.

5. The invention described in claim 1 wherein the means suspending the tank permits limited fore-and-aft movement of the tank.

6. An agricultural implement comprising: a main frame; transversely spaced apart fore-and-aft extending members carried on the frame and having front and rear ends; a flexible receptacle receivable between said members; receptacle support means having transversely spaced fore-and-aft extending sides for engaging the respective ends of said members, sliding therealong and resting on said members; a flexible support band encircling the lower portion and sides of the receptacle; and means connected to the sides of the band and suspended from the support means for permitting limited rocking movement of the receptacle relative to the frame.

7. The invention described in claim 6 wherein the means connected to the band and suspended from the support means includes a plurality of hanger elements connected to the sides of the band, extending vertically therefrom alongside the receptacle and connected to the support means inwardly of the receptacle sides.

8. The invention described in claim 7 wherein the hanger elements extend vertically above the top of the receptacle.

9. In an agricultural implement having a main frame, transversely spaced apart frame carried fore-and-aft extending members having front and rear ends, and a flexible tank receivable between said members, the improvement comprising: tank support means including a support structure having transversely spaced fore-and-aft extending side members for engaging the fore-and-aft members, sliding therealong and resting thereon; a flexible saddle supporting sides and lower portion of the tank; hanger elements fixed with the sides of the saddle and having upper ends extending above the top of the tank sides, each hanger element mounted on the support means inboard of the tank sides for permitting the hangers to shift to accomodate deforming of the tank and saddle.

10. The invention described in claim 9 wherein the hanger elements are mounted so as to permit limited fore-and-aft movement of the tank and saddle.

11. Structure for suspending from an overhead frame an elongated flexible tank subject to deformation by loads within an external conditions from without, comprising: a sheet metal saddle open at opposite ends and having opposite sides bearing against the respective tank sides and an underside bearing against the bottom of the tank, said saddle conforming to the size and shape of the tank and exposing opposite ends of the tank, the sides of said saddle further having opposite upper edges terminating adjacent the top of the tank; a plurality of hanger elements fixed to the sides adjacent the aforesaid edges and extending vertically above the edges; a hanger support mounted on the overhead frame having openings therein for receiving the upper ends of the hangers; and means mounting the respective hangers on the support to permit the hangers to shift to accomodate deforming of the tank and saddle.

12. In a vehicle having a fore-and-aft extending frame, structure for suspending from said frame a flexible tank subject to deformation by loads within and external conditions from without comprising: a flexible saddle structure supporting the tank, said structure having opposite sides bearing against the respective tank sides and an underside bearing against the tank bottom, the opposite ends of said tank being exposed; a saddle support slidably mounted on the frame; hanger elements fixed to the opposite sides of the saddle structure and extending vertically therefrom adjacent said tank; and means mounting the respective hanger elements on the saddle support to permit the hangers to rock to accomodate deforming of the tank or saddle.

13. The invention described in claim 12 wherein the saddle support is mounted on the frame for sliding fore-and-aft movement relative thereto.

14. The invention described in claim 12 wherein hanger elements are fixed to the upper edges of the sides of the saddle structure and extend vertically therefrom above the top of said tank to means mounting them on the saddle support inwardly of the tank sides.

15. Structure for suspending from an overhead frame an elongated plastic tank subject to deformation by loads within and external conditions from without, comprising: a sheet metal saddle open at opposite ends and having opposite sides bearing against the respective tank sides and an underside bearing against the bottom of the tank, said saddle conforming to the size and shape of the tank and exposing opposite ends of the tank, the sides of said saddle further having opposite upper edges terminating adjacent the top of the tank; a plurality of hanger elements fixed to the sides adjacent the aforesaid edges and extending vertically above the edges; and a hanger support mounted on the overhead frame receiving and mounting the respective hangers on the support so as to permit the hangers to shift.

16. The invention described in claim 15 in which the hanger elements are fixed to external sides of said sheet metal saddle and have upper threaded ends and the hanger support has openings for receiving the threaded ends and complimentary threaded members are carried on the threaded upper ends that rockably bear against the hanger support.

* * * * *

UNITED STATES PATENT OFFICE
CERTIFICATE OF CORRECTION

Patent No. 4,102,540     Dated  25 July 1978

Inventor(s)  Robert Eugene Fox and Wendell Dale Reece

It is certified that error appears in the above-identified patent and that said Letters Patent are hereby corrected as shown below:

Column 3, line 67, after "supporting" insert --the--.

Signed and Sealed this

Twelfth Day of June 1979

[SEAL]

Attest:

RUTH C. MASON
Attesting Officer

DONALD W. BANNER
Commissioner of Patents and Trademarks